United States Patent [19]
Gellert

[11] Patent Number: 5,853,777
[45] Date of Patent: Dec. 29, 1998

[54] NOZZLE RETAINING APPARATUS

[76] Inventor: Jobst Ulrich Gellert, 7A Prince Street, Georgetown, Ontario, Canada, L7G 2X1

[21] Appl. No.: 878,034

[22] Filed: Jun. 18, 1997

[30] Foreign Application Priority Data

Jun. 4, 1997 [CA] Canada .................................. 2206972

[51] Int. Cl.⁶ .................................................. B29C 45/22
[52] U.S. Cl. .................... 425/549; 264/328.15; 425/570; 425/572
[58] Field of Search .................................... 425/570, 572, 425/588, 549; 264/328.15

[56] References Cited

U.S. PATENT DOCUMENTS

| | | | |
|---|---|---|---|
| 5,049,062 | 9/1991 | Gellert | 425/549 |
| 5,268,184 | 12/1993 | Gellert | 425/549 |
| 5,460,510 | 10/1995 | Gellert | 425/562 |

*Primary Examiner*—Tim Heitbrink
*Attorney, Agent, or Firm*—Dalesman & Company

[57] ABSTRACT

Apparatus for stack injection molding wherein a melt distribution manifold is mounted between two manifold retainer plates. A number of heated nozzles are seated in each plate with the nozzles in one plate extending in an opposite direction to the nozzles in the other plate. The nozzles in the one plate are held in place by the manifold being secured to that plate. The nozzles in the other plate each have retaining apparatus to hold them in place during assembly and disassembly. Each nozzle retaining apparatus has a main body with a screw opening therethrough and an elongated pin extending laterally therefrom. The pin extends into a hole in the nozzle and a screw extending through the screw opening in the main body is tightened into a hole in the manifold retainer plate to secure the nozzle in place during assembly and disassembly of the manifold retainer plates.

3 Claims, 4 Drawing Sheets

NOZZLE RETAINING APPARATUS

BACKGROUND OF THE INVENTION

This invention relates generally to stack injection molding having a melt distribution manifold extending between two manifold retainer plates and more particularly to apparatus for removably retaining each nozzle in one of the manifold retainer plates during assembly and disassembly.

Multi-cavity injection molding using a stack molding configuration with a melt distribution manifold extending between two manifold retainer plates is well known as shown, for instance, in the applicant's U.S. Pat. No. 5,460,510 which issued Oct. 24, 1995. However, as these systems become larger and larger with more nozzles seated in each manifold retainer plate, retaining the nozzles in place during assembly and disassembly becomes more and more of a problem. Retention of the nozzles in one of the manifold retainer plates is readily accomplished by securing the melt distribution manifold to the manifold retainer plate across the rear ends of the nozzles. However, retention of the nozzles in the other manifold retainer plate has been a difficult problem. This is particularly true during disassembly when residual plastic secures some of the nozzles to the melt distribution manifold when the manifold retainer plates are pulled apart.

SUMMARY OF THE INVENTION

Accordingly, it is an object of the present invention to at least partially overcome the disadvantages of the prior art by providing apparatus to removably retain each nozzle in place in one of the manifold retainer plates during assembly and disassembly of the mold.

To this end, in one of its aspects, the invention provides injection molding apparatus for stack molding having a number of heated nozzles. Each nozzle has a rear end, a front end, and a central melt bore for conveying melt to a gate leading to a cavity in a mold adjacent the front end of the nozzle. A melt distribution manifold secured to one of the manifold retainer plates is mounted between the two manifold retainer plates and the two manifold retainer plates are secured together. One group of the nozzles are seated in one of the manifold retainer plates with their front ends extending away from the melt distribution manifold. Each nozzle of the group of the nozzles is retained in a seat in the manifold retainer plate by a face of the melt distribution manifold abutting against the rear end of the nozzle. Another group of the nozzles are seated in the other manifold retainer plate with their front ends extending away from the melt distribution manifold in the opposite direction. Nozzle retaining apparatus for retaining each nozzle in a respective seat in the other manifold retainer plate during assembly and disassembly includes a main body having a screw opening therethrough, a pin extending laterally from the main body into a matching opening in the nozzle, and a screw extending through the screw opening in the main body into a threaded hole in the other manifold retainer plate to removably secure the main body and the pin to the other manifold retainer plate.

Further objects and advantages of invention will appear from the following description taken together with the accompanying drawings.

DETAILED DESCRIPTION OF THE INVENTION

Figure 1:
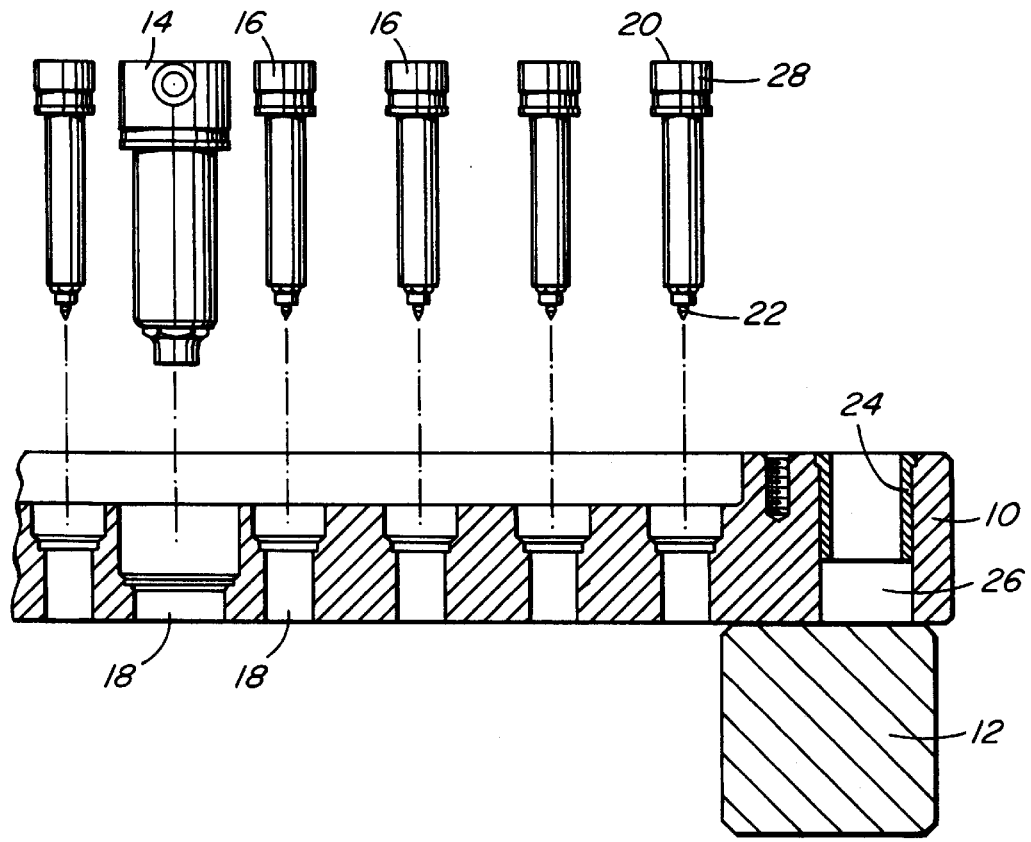
FIG. 1 is a partial sectional view of a portion of a stack molding apparatus showing nozzles in position to be inserted into openings in one of the manifold retainer plates.

Reference is first made to FIG. 1 which shows a portion of one of the steel manifold retainer plates 10 supported in a horizontal position by support blocks 12. A large supply nozzle 14 and a number of smaller heated nozzles 16 are shown in position for insertion into openings 18 extending through the manifold retainer plate 10. Each of the conventional nozzles 16 have a rear end 20, a front end 22 and a central melt bore for conveying melt to a gate leading to a cavity in a mold (not shown) adjacent the front end 22 of the nozzle 16. This manifold retainer plate 10 has guide pin bushings 24 seated in a guide pin openings 26 extending through the manifold retainer plate 10.

Figure 2:
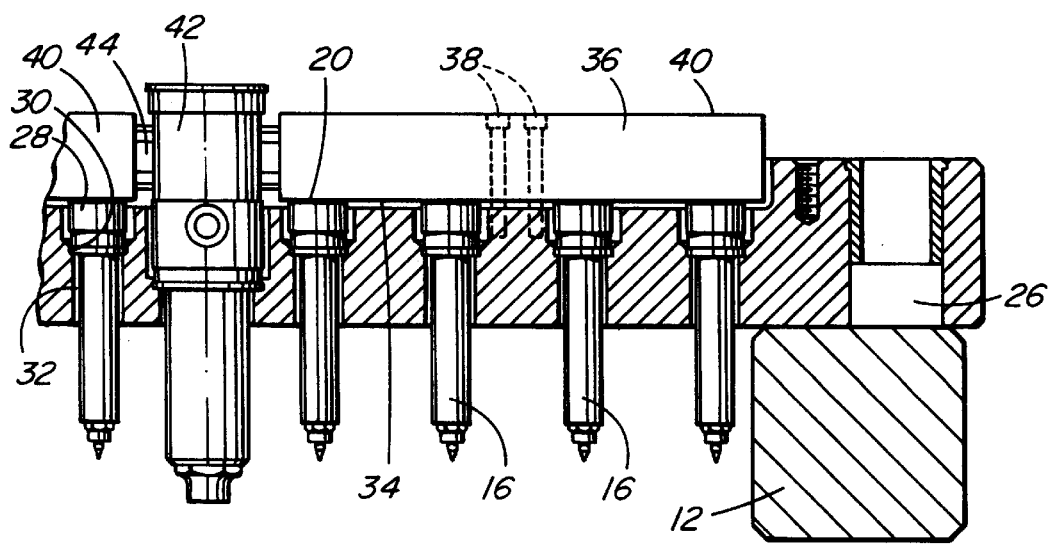
FIG. 2 is a partial sectional view of the same manifold retainer plate with the nozzles seated in place and the melt distribution manifold secured thereto.

As seen in FIG. 2, the nozzles 16 are each seated in one of the openings 18 with a collar portion 28 of each nozzle 16 sitting in a circular seat 30 extending around the opening 18 to provide an insulative air space 32 between the heated nozzle 16 and the surrounding cooled manifold retainer plate 10. These nozzles 14, 16 are secured in place by the rear ends 20 of the nozzles 16 abutting against the face 34 of a manifold 36 which is securely attached to the manifold retainer plate by screws 38. While the melt distribution manifold 36 having a melt passage (not shown) extending therethrough to convey melt to the nozzles 16 can have many configurations, in the embodiment shown it comprises two nozzle manifolds 40 connected to a central manifold 42 by connector bushings 44.

Figure 3:
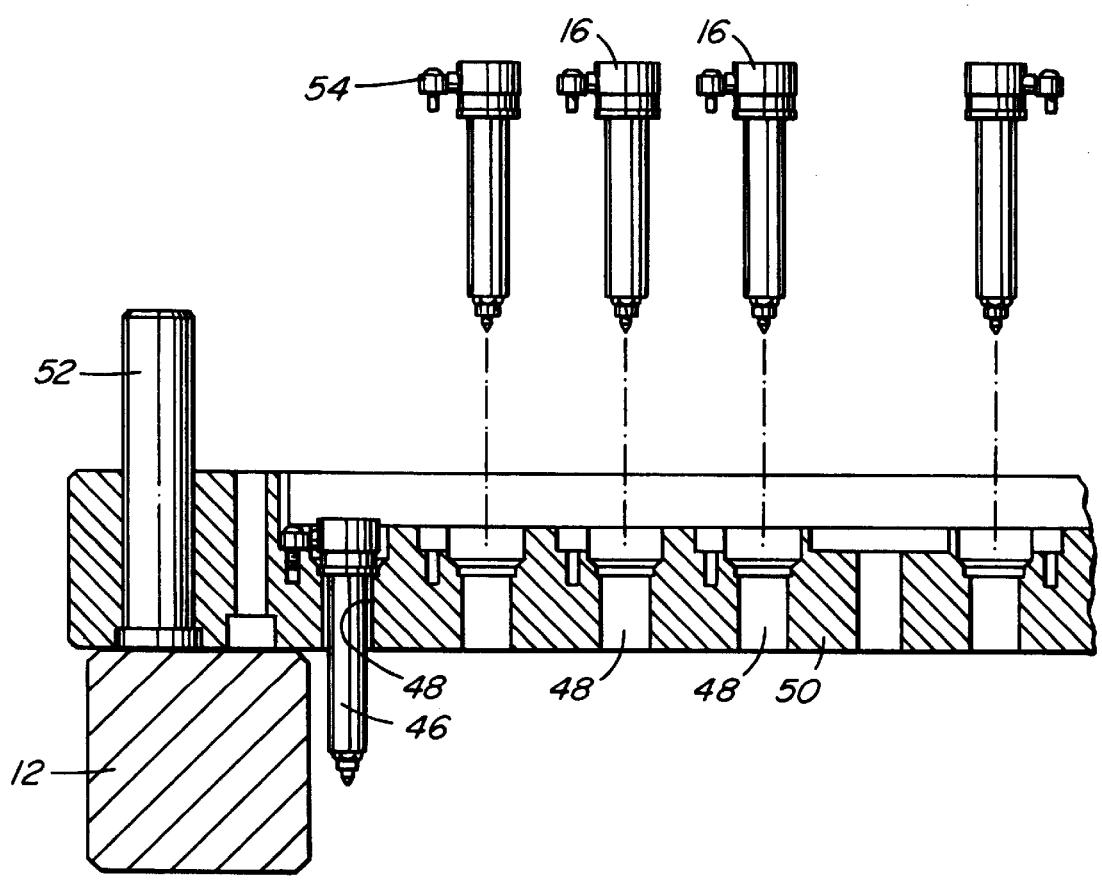
FIG. 3 is a partial sectional view of the other manifold retainer plate with one of the nozzles secured in place with retaining apparatus according to a preferred embodiment of the invention.

Reference is now made to FIG. 3 which shows one nozzle 46 of another group of the nozzles 16 seated in a similar opening 48 extending through another steel manifold retainer plate 50 supported in a horizontal position by blocks 12. As can be seen, this manifold retainer plate 50 has guide pins 52 extending therefrom to be received in the guide pin openings 26 in the first manifold retainer plate 10 to ensure the two manifold retainer plates 10 and 50 are properly aligned when assembled together.

Figure 5:
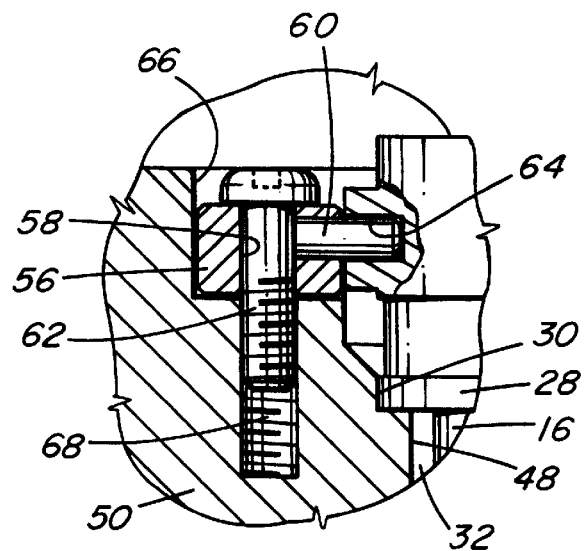
Figure 6:
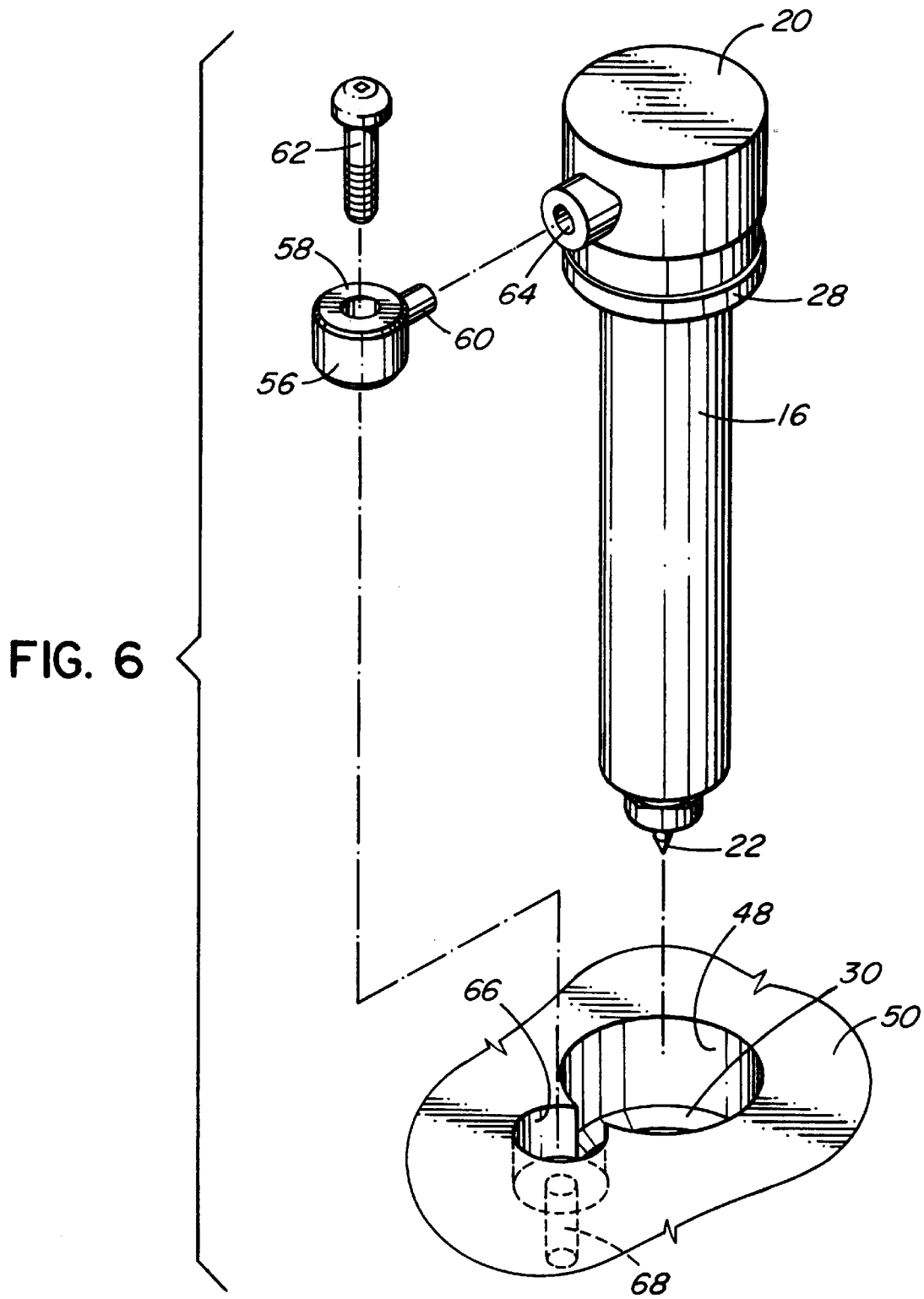
FIG. 6 is an exploded isometric view showing the nozzle retaining apparatus in position to be mounted to retain one of the nozzles in place.

Referring also to FIGS. 5 and 6, a nozzle retaining apparatus 54 according to a preferred embodiment of the invention is shown to removably secure each of the nozzles 16 in a seat 30 in the opening 48 in the manifold retainer retainer plate 50. In this embodiment, the nozzle retaining apparatus 54 comprises a cylindrical main body 56 with a screw opening 58 extending centrally therethrough and an elongated pin 60 extending laterally therefrom. A threaded screw 62 fits through the screw opening 58 to removably secure it to the manifold retainer plate 50. In this embodiment, the pin 60 is integrally brazed to the main body 56, but in other embodiments, this need not be the case. Also, the main body 56 can have a variety of different shapes which will receive the retaining screw 62 and have sufficient strength to retain the nozzle 16 in place.

In use, the pin 60 of a nozzle retaining apparatus 54 is inserted into a matching hole 64 in the collar portion 28 of each of the nozzles 16. As best seen in FIG. 3, each nozzle 16 is then seated in one of the openings 48 in the manifold retainer plate 50 with the cylindrical main body 56 fitting in an adjacent matching recess 66. The retaining screw 62 extending through the screw opening 58 in the main body 56 is then tightened into a threaded hole 68 in the manifold retainer plate 50 to secure the nozzle 16 in place. Of course, the nozzle is easily removable following disassembly of the mold by unscrewing screw 62.

Figure 4:
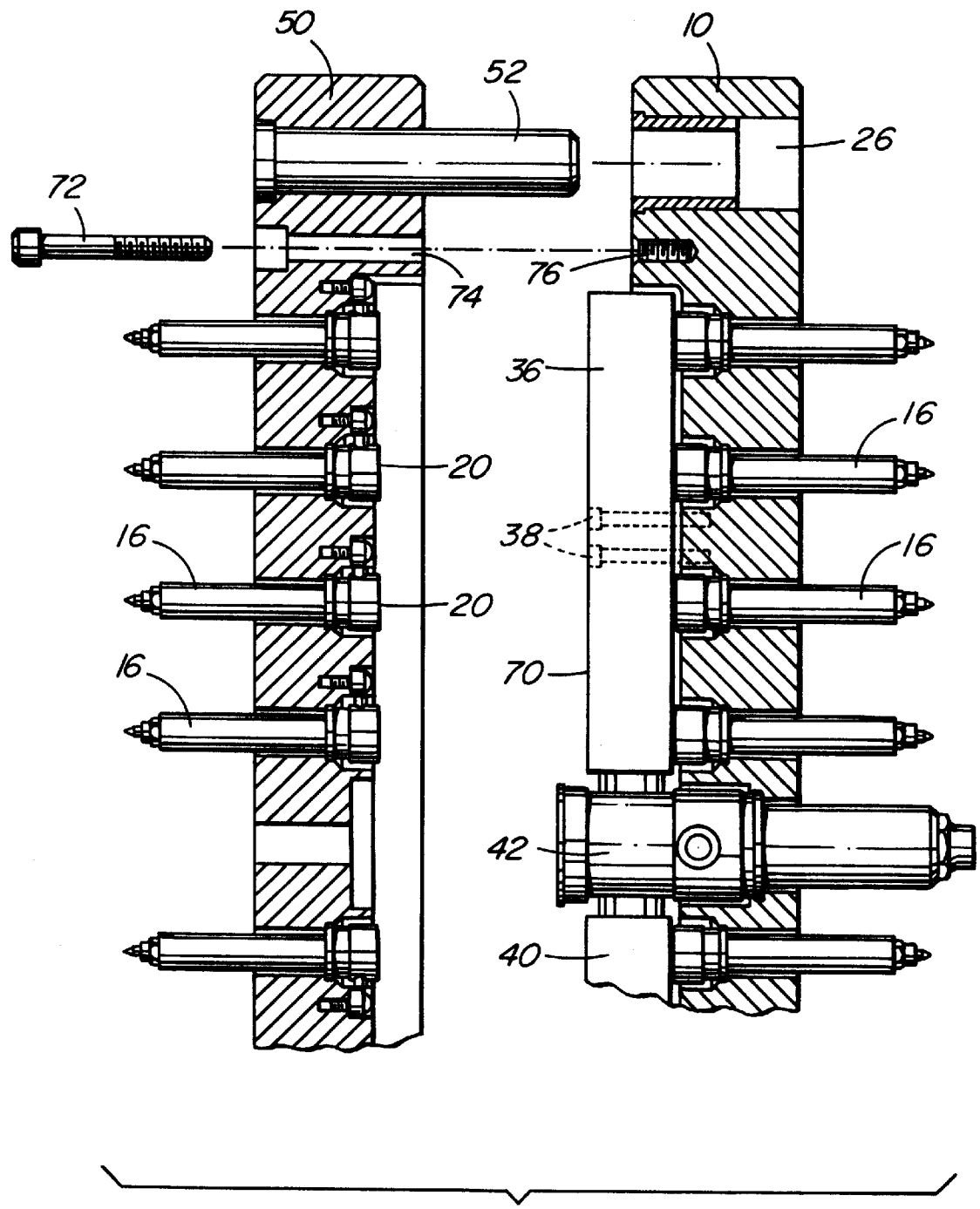
FIG. 4 is a similar partial sectional view showing the two plates in position for assembly together, FIG. 5 (on the same page as FIG. 3) is a partial sectional view showing one of the nozzle retaining apparatus.

Reference is now made to FIG. 4 to show how the two manifold retainer plates 10 and 50 are assembled and, if necessary disassembled. During assembly, after the nozzles 14 and 16 and the melt distribution manifold 36 are mounted as described above, the two manifold retainer plates 10 and 50 are normally oriented in the vertical position shown in FIG. 4 and then moved together until the guide pins 52 extending from manifold retainer plate 50 are received in the guide pin openings 26 in the first manifold retainer plate 10. As will be appreciated it is critical that the nozzles 16 seated in the manifold retainer plate 50 be retained in place during this procedure. If just one of them with its associated wiring falls slightly out of place it can result in a very time consuming and costly malfunction of the system. The two manifold retainer plates 10 and 50 are then moved closer together until the other face 70 of the manifold 36 abuts against the rear ends 20 of the nozzles 16 seated in manifold retainer plate 50. Screws 72 extending through holes 74 in manifold retainer plate 50 and into threaded holes 76 in manifold retainer plate 10 are then tightened in place to hold the two manifold retainer plates 10 and 50 securely together. This process is reversed for disassembly of the manifold retainer plates 10 and 50. The nozzle retaining apparatus 54 according to the invention is even more critical during disassembly after use, as solidified melt in the melt passage (not shown) extending from the melt distribution manifold 36 into the nozzles 16 is strong enough to pull some of the nozzles 16 out of place as the manifold retainer plate 50 is withdrawn.

While the description of the injection molding apparatus with the nozzle retaining apparatus 54 to hold the nozzles 16 securely in place during assembly and disassembly has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In an injection molding apparatus for stack molding having a plurality of heated nozzles with each nozzle having a rear end, a front end, and a central melt bore for conveying melt to a gate leading to a cavity in a mold adjacent the front end of the nozzle, wherein a melt distribution manifold secured to a first manifold retainer plate is mounted between the first manifold retainer plate and a second manifold retainer plate secured to the first manifold retainer plate, a first group of the nozzles are seated in the first manifold retainer plate with the front ends of the first group of the nozzles extending away from the melt distribution manifold in one common direction, each nozzle of the first group of the nozzles being retained in a seat in the first manifold retainer plate by a face of the melt distribution manifold abutting against the rear end of the nozzle, a second group of the nozzles are seated in the second manifold retainer plate with the front ends of the second group of nozzles extending away from the melt distribution manifold in a common direction opposite to the direction in which the first group of the nozzles extend, the improvement further comprising;

nozzle retaining apparatus for retaining each nozzle of the second group of nozzles in a respective seat in the second manifold retainer plate during assembly and disassembly comprising a main body having a screw opening therethrough, a retaining pin extending laterally from the main body into a matching opening in the nozzle, and a screw extending through the screw opening in the main body into a threaded hole in the second manifold retainer plate to removably secure the main body and the retaining pin to the second manifold retainer plate.

2. Injection molding apparatus as claimed in claim 1 wherein the main body of each nozzle retaining apparatus is cylindrical with the screw opening extending centrally therethrough and the pin extending radially therefrom.

3. Injection molding apparatus as claimed in claim 2 wherein the main body and the retaining pin of each nozzle retaining apparatus are brazed together.

* * * * *